UNITED STATES PATENT OFFICE.

WERNER KELBE, OF HÖCHST-ON-THE-MAIN, GERMANY, ASSIGNOR TO FARB-WERKE, VORM. MEISTER, LUCIUS & BRÜNING, OF HÖCHST-ON-THE-MAIN, GERMANY, A CORPORATION OF GERMANY.

BLACK SULFUR DYE AND PROCESS OF MAKING SAME.

SPECIFICATION forming part of Letters Patent No. 701,051, dated May 27, 1902.

Application filed March 15, 1901. Serial No. 51,270. (Specimens.)

*To all whom it may concern:*

Be it known that I, WERNER KELBE, Ph. D., professor of chemistry, a citizen of the Empire of Germany, residing at Höchst-on-the-Main, Germany, have invented a certain new and useful Black Sulfur Dye and Process of Making Same, of which the following is a specification.

I have found that the formation of sulfurized dyestuffs directly dyeing unmordanted cotton takes place if such bodies are heated with sulfur and sulfids of alkali metals as contain halogens instead of groups which appear to further the formation of such dyestuffs—as, for instance, nitro-amido or sulfonic groups. Here the dyestuffs are evidently formed by the aid of halogens, which are easily recognized in the aqueous solution of the melt. According to my experience it appears as if here the sulfonic group would also be necessary besides the halogen for the formation of the dyestuff. The dyestuffs thus obtained are not of a pure black, but a dark brown. This is changed, however, if a nitro group be substituted for a part of the halogen or the sulfonic group. The appearance of the nitro group next to the halogen or instead of the sulfonic group is the cause of very valuable pure black dyestuffs being obtained. If, for instance, dichlorophenolsulfonic acid, obtained by introducing chlorin into an aqueous solution of phenolsulfonate of sodium, be heated with sulfur and sulfids of alkali metals, a dyestuff will be obtained which has all the properties hitherto known of the sulfur dyestuffs and which in concentrated solution dyes unmordanted cotton a deep black-brown. If in the dichlorophenolsulfonic acid a nitro group be then substituted for the halogen or sulfonic group, the chloronitrophenolsulfonic acid yields a pure black dyestuff and the dichloronitrophenol a green-black dyestuff, which also becomes deep black on subsequent treatment with copper.

Examples.

*Manufacture of the dyestuff from chloronitrophenolsulfonic acid.*—Thirty kilos of crystallized sodium sulfid are molten in an iron vessel and heated with ten kilos of sulfur till the latter is dissolved. To this solution are gradually introduced ten kilos of air-dried pulverized chloronitrophenolsulfonate of sodium, and the mixture is then heated to from 160° to 190° centigrade till a test portion dissolved in water dyes unmordanted cotton pure black. The finished melt, which may also be directly employed for dyeing, is dissolved in water, and the dyestuff is precipitated with common salt. The dyestuff is filtered, washed with a solution of common salt, and dried.

*Manufacture of the dyestuff from dichloronitrophenol.*—Twenty kilos of crystallized sodium sulfid are molten in an iron vessel and heated with ten kilos of sulfur till the latter is dissolved. To this solution are gradually introduced five kilos of dry dichloronitrophenol, and the mixture is treated as in the previous example.

Instead of chloronitrophenolsulfonic acid or dichloronitrophenol separately the mixture of these compounds may be employed. It is obtained by treating mono and di chlorophenolsulfonic acids obtained by the chlorination of para-phenolsulfonic acid in an aqueous solution with nitric acid.

The dyestuff thus obtained from dichloronitrophenol is a deep-black powder insoluble in water and alkali carbonates and partly soluble in caustic alkalies. It is completely soluble in a solution of sulfids of alkali metals and dyes in this solution unmordanted cotton green-black. This dye becomes deep black on treatment with copper.

The dyestuff obtained from chloronitrophenolsulfonic acid represents likewise a deep-black powder. It differs somewhat, however, from the previously-mentioned dyestuff, as it dissolves partly already in boiling water, but only completely in sulfids of alkali metals. In this solution it also dyes unmordanted cotton deep black. Both dyestuffs are separated by acids from their alkaline solutions as a black powder.

Having now described my invention, what I claim is—

1. Process for the manufacture of sulfurized dyestuffs dyeing unmordanted cotton, which consists in heating halogen-substituted nitrophenols, wherein the hydrogen of the benzene nucleus may also be substituted by the sulfo group, with sulfur and sulfids of alkali metals, substantially as set forth.

2. As a new product, the dyestuff obtained by heating dichloronitrophenol,

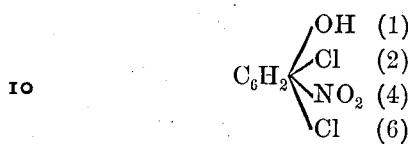

with sulfur and sulfids of alkali metals, being a deep-black powder, insoluble in water and alkali carbonates, partly soluble only in caustic alkalies; readily soluble in a solution of sulfids of alkali metals and dyeing unmordanted cotton green-black, which becomes deep black on treatment with copper.

In testimony that I claim the foregoing as my invention I have signed my name in presence of two subscribing witnesses.

WERNER KELBE.

Witnesses:
ALFRED BRISBOIS,
BERNHARD LEYDECKER.